Sept. 10, 1929.  L. BERGE  1,727,805

STAMPED DRIVE GEAR

Filed March 4, 1927

Inventor
Louis Berge

By Blackmore, Spencer & Finch
Attorneys

Patented Sept. 10, 1929.

1,727,805

UNITED STATES PATENT OFFICE.

LOUIS BERGE, OF FLINT, MICHIGAN, ASSIGNOR TO A C SPARK PLUG COMPANY, OF FLINT, MICHIGAN, A COMPANY OF MICHIGAN.

STAMPED DRIVE GEAR.

Application filed March 4, 1927. Serial No. 172,707.

This invention relates to gearing structure. It involves a novel gear and a method of gear making.

An object of the invention is to effect an economy in gear making and to simplify the process of making gears.

Other objects and advantages will be obvious from the following specification and from the accompanying drawing.

In the drawing, there is illustrated a speedometer drive representing one useful field for my new gear, although it will be understood that its use is by no means restricted to that field.

Figure 4:
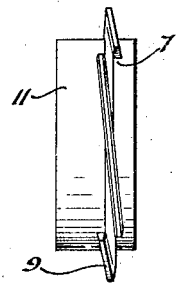
Figure 4 shows in edge elevation a similar gear carried by a die cast hub.

Referring by reference characters to the drawing, numeral 5 represents a ring member formed from flat stock. The ring has a plurality of radial slits 7, four being shown equally spaced around its outer circumference, the slits extending substantially half way through the ring and forming four quadrants 9. The ring is then stamped into a shape best shown by Figure 3, whereby the metal of each quadrant is substantially undisturbed at the middle position of the quadrant but at the ends of the quadrant is forced out of the plane of the ring. The deflection in the case of each quadrant is in the opposite direction at its two ends, and adjacent ends of the quadrants have opposite deflections. A gear thus formed may be used singularly or several such gears may be associated together. In Figure 4 I have shown a hub 11 preferably formed by die casting with a gear prepared as described united thereto by being embedded in the die cast hub in the process of making the same.

Figure 1:
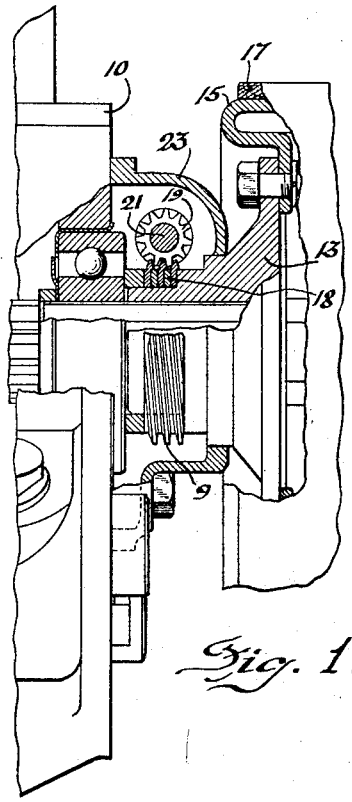
Figure 1 shows in elevation, partly in section, a vehicle transmission shaft provided with my novel gear for driving a speedometer.
Figure 2:
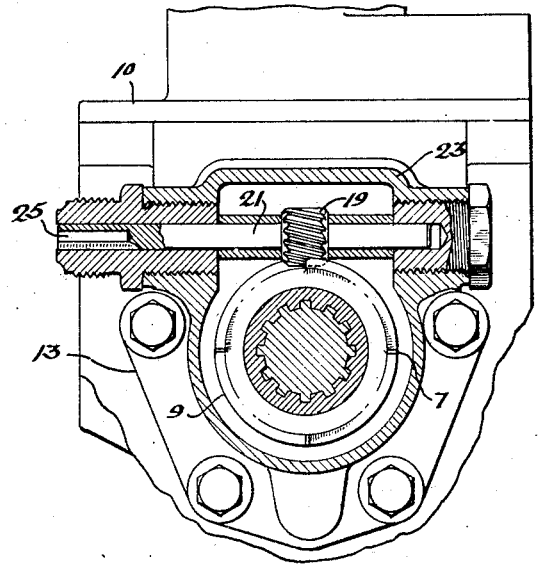
Figure 2 is a transverse section at right angles to Figure 1.
Figure 3:
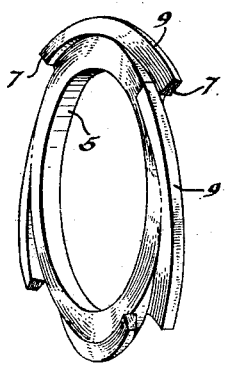
Figure 3 is a perspective of a gear element after manufacture.

In Figures 1 and 2 I have shown a vehicle transmission housing 10 from which projects a transmission shaft upon which is mounted a sleeve 13. Although not material to the invention the sleeve is shown as having secured thereto a drum 15 which is engaged by a band 17 of the transmission brake. Three gear elements of the kind shown in Figure 3 are assembled together and secured on a reduced part of the sleeve, suitable spacing rings 18 being positioned between adjacent gear elements. These spacing rings have a radial size corresponding to the uncut portions of the gear elements and are of sufficient thickness to space the gear elements such that the deflected portions of the adjacent teeth fall into alignment to produce in effect continuous teeth. In Figure 2 the gear so formed is shown as in driving engagement with a drive gear 19 on a shaft 21 positioned transversely in an auxiliary housing, or cover 23 bolted to the transmission housing. This shaft 21 has an opening 25 adapted to receive a connecting member carried by the usual flexible speedometer shaft. A gear of the kind described may be used in many relations. It is cheap to manufacture, saving all the cost of gear cutting and is strong and serviceable.

I claim:

1. The method of making a gear consisting in forming annular blanks, distorting successive portions of the outer circumference of each of the blanks from the plane of the blanks and assembling the gear elements so formed in a co-axial series to form a spiral gear.

2. A gear composed of a series of rings coaxially arranged, each ring having its outer circumference cut into segmental portions, each of said portions having its ends oppositely deflected from the plane of the ring, whereby the segmental portions of the adjacent rings make a continuous spiral gear tooth.

3. A gear ring consisting of a flat disc, the outer circumference of the disc being divided into equal portions, each portion being deflected across the plane of the disc, the planes of the several deflected portions being parallel and each at a small acute angle to the plane of the disc whereby a plurality of such gear rings may be assembled into a composite gear.

In testimony whereof I affix my signature.

LOUIS BERGE.